(12) United States Patent
Tang et al.

(10) Patent No.: US 11,520,722 B2
(45) Date of Patent: Dec. 6, 2022

(54) ON-CHIP NON-POWER OF TWO DATA TRANSACTIONS

(71) Applicant: Microsoft Technology Licensing, LLC, Redmond, WA (US)

(72) Inventors: Monica Man Kay Tang, Santa Clara, CA (US); Ruihua Peng, San Jose, CA (US); Matthew Willis Daniel, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/228,471

(22) Filed: Apr. 12, 2021

(65) Prior Publication Data

US 2022/0327078 A1  Oct. 13, 2022

(51) Int. Cl.
*G06F 13/40* (2006.01)

(52) U.S. Cl.
CPC ........ *G06F 13/4018* (2013.01); *G06F 13/404* (2013.01)

(58) Field of Classification Search
CPC .................. G06F 13/404; G06F 13/4018
USPC ........................................................... 710/66
See application file for complete search history.

(56) References Cited

U.S. PATENT DOCUMENTS

| | | | | |
|---|---|---|---|---|
| 7,543,088 | B2* | 6/2009 | Weber | H04L 49/25 |
| | | | | 710/110 |
| 9,461,913 | B2* | 10/2016 | Soulie | H04L 45/72 |
| 9,699,079 | B2* | 7/2017 | Chopra | H04L 45/74 |
| 9,880,960 | B1* | 1/2018 | Diamant | G06F 13/4221 |
| 10,042,766 | B1* | 8/2018 | Ringe | G06F 12/0833 |
| 10,725,958 | B1* | 7/2020 | Ringe | G06F 13/4059 |
| 2006/0218332 | A1 | 9/2006 | Boudreau | |
| 2013/0051391 | A1* | 2/2013 | Jayasimha | H04L 45/60 |
| | | | | 370/392 |
| 2016/0026588 | A1* | 1/2016 | Chu | G06F 13/4221 |
| | | | | 710/104 |
| 2019/0196990 | A1 | 6/2019 | Laughton et al. | |
| 2020/0257647 | A1 | 8/2020 | Ringe et al. | |

OTHER PUBLICATIONS

"International Search Report and Written Opinion issued in PCT Application No. PCT/US22/021240", dated Jul. 11, 2022, 9 Pages.

* cited by examiner

*Primary Examiner* — Brian T Misiura
(74) *Attorney, Agent, or Firm* — Fountainhead Law Group PC

(57) ABSTRACT

Embodiments of the present disclosure include techniques for transferring non-power of two (2) bytes of data between modules of an integrated circuit over an on-chip communication fabric. In one embodiment, the present disclosure includes an on-chip communication fabric, a first module comprising an interface coupled to the fabric having a first data width, and a second module comprising an interface coupled to the fabric having a second data width smaller than the first data width. The non-power of two (2) bytes of data are sent between the first and second modules through the fabric, and the fabric maps the non-power of two (2) bytes of data between the first and second data widths.

17 Claims, 7 Drawing Sheets

ON-CHIP NON-POWER OF TWO DATA TRANSACTIONS

BACKGROUND

The present disclosure relates generally to communicating data in an on-chip environment, and more specifically to non-power of two (2) data transactions.

On-chip communications typically involve different modules on an integrated circuit communicating with each other over a communication fabric. The modules are coupled to the fabric over a number of wires, each carrying one bit of information. Different modules on the chip may be coupled to the communication fabric using different numbers of wires. Accordingly, different modules may have different interfaces to the fabric.

FIG. 1 illustrates a conventional power of two (2) data transfer. Here, a sender module 101 is coupled to the communication fabric 102 over a first interface capable of transferring N bytes of data per cycle, for example. A target module 103 may be coupled to the communication fabric 102 over a second interface capable of transferring M bytes of data per cycle. Data is typically sent in payloads of powers of two (2) (e.g., 32 B, 64 B, 128 B, 256 B). However, interface mismatches can result in undesirable inefficiencies. For instance, sender module 101 may send data 150 on a cycle 120 that does not use all the bytes available during a transfer (e.g., unused bytes 151). Additionally, when such bytes are transferred to the target module 103, they must be reconfigured for a different power of two (2) matching the interface of the target. For example, if the sender module has a 128 B interface, the sender module may send data in 128 B chunks (e.g., 128 B, 256 B, 384 B). However, if the sender module only has 120 B of data, then the full data width of the interface may not be used. Similarly, for data transfer over multiple cycles 121, if sender module sends 160 B of data, the first cycle uses the full width of the interface, but the second cycle is only partially full. As a result, two (2) cycles (aka bursts or beats) transfer 256 B, of which portions 152 and 153 are used and another portion 154 in the second cycle is unused (e.g., don't care). On the target side, if the target has a 32 B interface, it can accept transactions in 32 B granularity. However, due to this width conversion, the target receives a burst length of 8 for a 256 B transaction from the sender, causing an extra 96 B of data to be transferred. This may include whole cycles on the receive side where only "don't care" data is processed. This is illustrated in FIG. 1 for cases where portion 151 is received across cycles at 151a-b and the last cycle only partially fills the target interface data width, leaving an additional unused portion 160.

When large amounts of data are being transferred at very high speeds, such inefficiencies translate in to wasted time and wasted power.

DETAILED DESCRIPTION

Described herein are techniques for on-chip non-power of two (2) data transactions. In the following description, for purposes of explanation, numerous examples and specific details are set forth in order to provide a thorough understanding of some embodiments. Various embodiments as defined by the claims may include some or all of the features in these examples alone or in combination with other features described below, and may further include modifications and equivalents of the features and concepts described herein.

Features and advantages of the present disclosure include on-chip communication techniques for transferring non-power of two (2) bytes of data over an on-chip communication fabric. According to various embodiments described herein, non-power of two (2) bytes of data may be transferred between modules on an integrated circuit, which reduces the amount of unused (e.g., don't care) portions of the data transfer to improve efficiency of the system (e.g., less wasted cycles for reduced power consumption and faster overall data transfer speeds).

Figure 1:
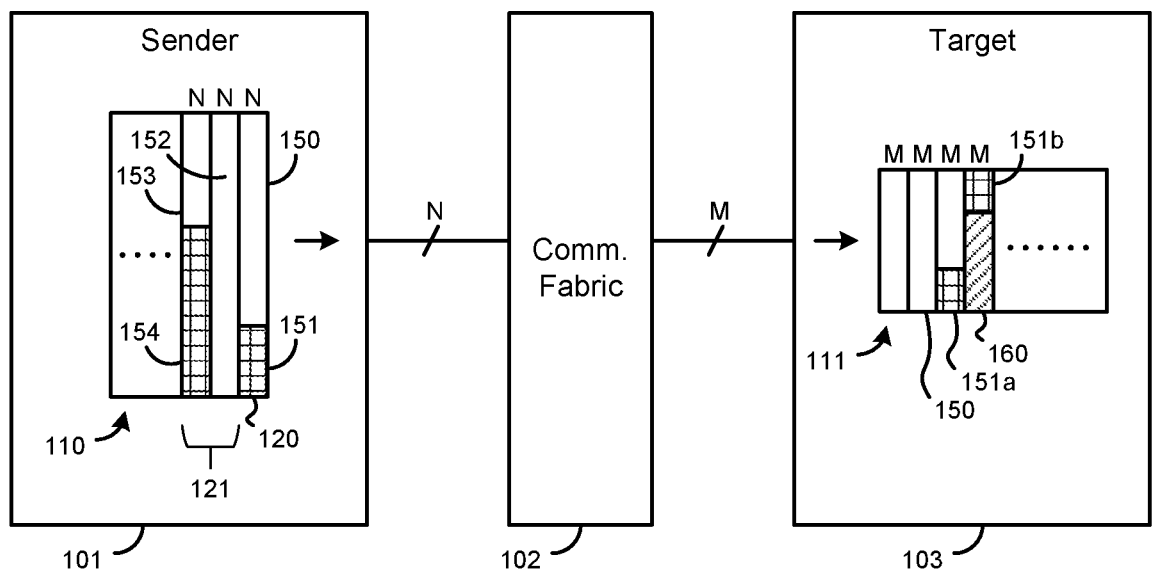
FIG. 1 illustrates a conventional power of two (2) data transfer.
Figure 2:
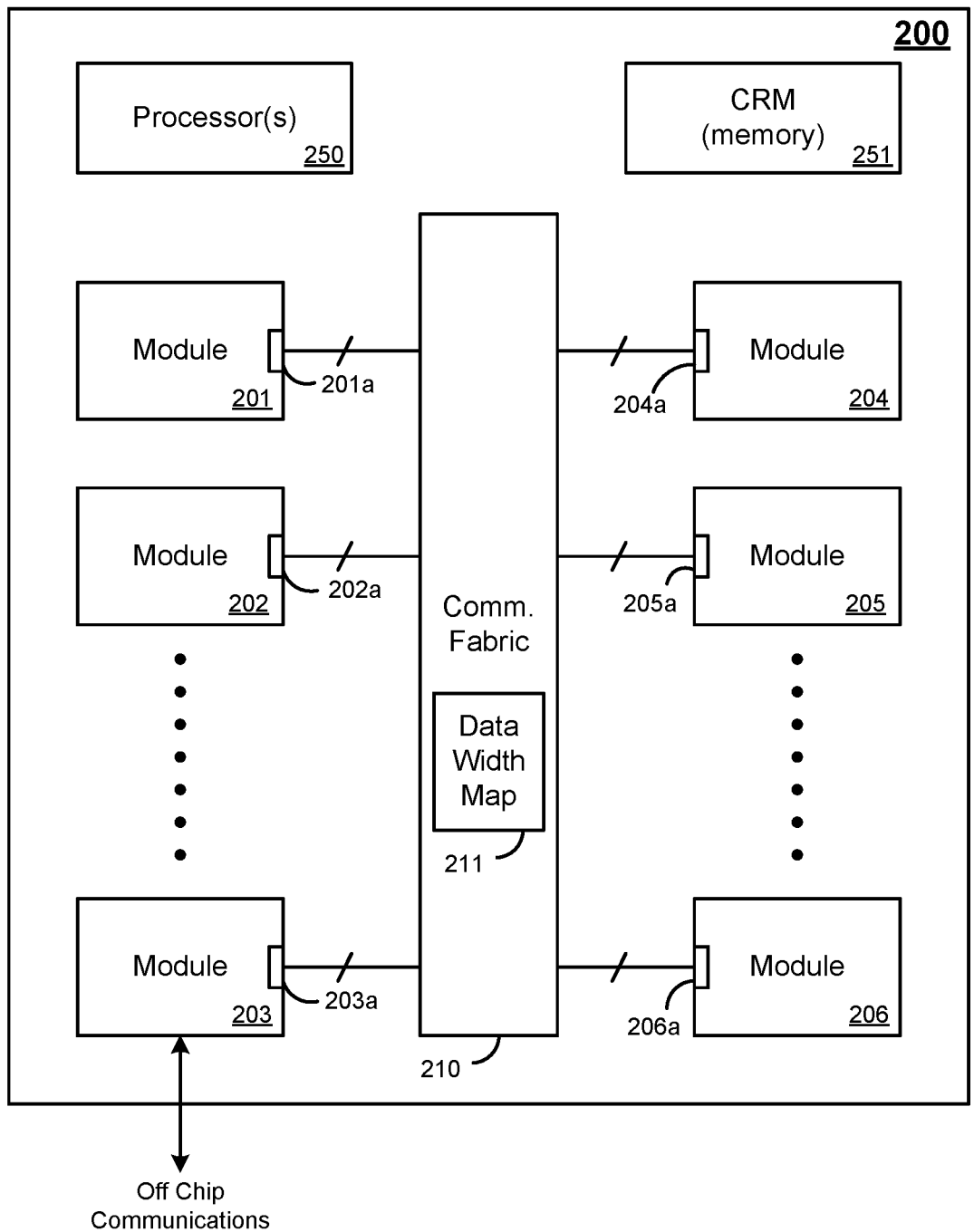
FIG. 2 illustrates an on-chip communication fabric for transferring non-power of two (2) bytes of data according to an embodiment.

FIG. 2 illustrates an on-chip communication fabric for transferring non-power of two (2) bytes of data between modules according to an embodiment. Here, an integrated circuit 200 (aka, a chip) may include a plurality of modules 201-206 for implementing various functions of the circuit. Chip 200 may be a microprocessor, microcontroller, graphics processor, system on a chip (SoC), artificial intelligence processor (e.g., a digital processor optimized for neural network computations), or any other digital processor that may need to transfer data between modules quickly and efficiently. Accordingly, modules may include a direct memory access (DMA) module, a cache module, a memory interface module, a chip interface module, a video decoder module, or any of a wide range of other modules, for example. Chip 200 may further include one or more control processors 250 and a non-transitory computer readable storage medium (CRM) 251. CRM 251 may store program code that is executed by processor(s) 250 to perform a variety of chip operations. Some operations may cause data transactions between modules 201-206, for example. Thus, CRM 251 may store program code executable by one or more control processors that cause the one or more control processors to transfer data according to the techniques described herein, for example. CRM 251 may include random access memory, such as static random access memory (SRAM) or other forms of volatile or non-volatile memory.

On-chip communication fabric 210 (aka fabric) provides high speed data communications between the modules. Fabric 210 may comprise an on-chip bus system connecting on-chip modules 201-206. Fabric 210 may perform transactions comprising a command and data transaction (e.g., transfer of data). In some embodiments, fabric 210 may comprise a synchronous bus having separate wires for commands and data, for example. Additionally, command and/or data transactions may be performed on one or more cycles (e.g., beats, where 1 beat equals one data transaction cycle). Data may be communicated between modules according to certain data communication protocols understood by modules 201-206 and fabric 210. Examples of such protocols include Advanced eXtensible Interface (AXI) and Open Core Protocol (OCP), for example. AXI is a parallel high-performance, synchronous, high-frequency, multi-master, multi-slave communication interface, designed for on-chip communication. Similarly, OCP defines an efficient, bus-independent, configurable and highly scalable interface for on-chip subsystem communications. Various embodiments of the techniques described herein may be implemented in AXI or OCP, for example. Some chips may include more than one fabric, for example. However, only one fabric 210 is shown here for illustrative purposes.

The illustrative embodiment shown in FIG. 2 includes modules 201-206 coupled to an on-chip communication fabric 210. Each module 201-206 may be coupled to fabric 210 by interfaces 201a-206a. The interfaces 201a-206a may comprise different data widths. For example, a high throughput wide data width may support data transfers of 128 B or 256 B or more per cycle. Smaller data widths may be 32 B, for example. Features and advantages of the present disclosure include a fabric 210 comprising a data width mapping component 211 to support non-power of two (2) byte data transfers between a sender module and a target module. For example, a sender module 201 includes an interface having a data width N and a target module 206 includes an interface having a data width M, where N and M are integers representing a number of bytes each interface can transfer per cycle and N is greater than M. Both interfaces are coupled to on-chip communication fabric 210. Modules 201-206 and fabric 210 may support non-power of two (2) byte data transfers. Accordingly, the sender may specify a data transaction as a specific number of bytes (rather than as a power of two (2) number of bytes), and the fabric may process the transaction over a number of cycles required to handle the exact number of bytes being transferred. Data width mapping component 211 may map (convert) the non-power of (2) bytes of data from the sender module's data width to the target module's data width. Because the fabric is mapping based on the actual data transfer size (e.g., not a power of two (2) data size including unused bytes), the exact number of bytes may be converted from the data width of the sender to the data width of the target to optimize the number of target interface cycles used to receive the data from the sender. Example transactions that illustrate certain advantages of this technique are described below.

Figure 3:
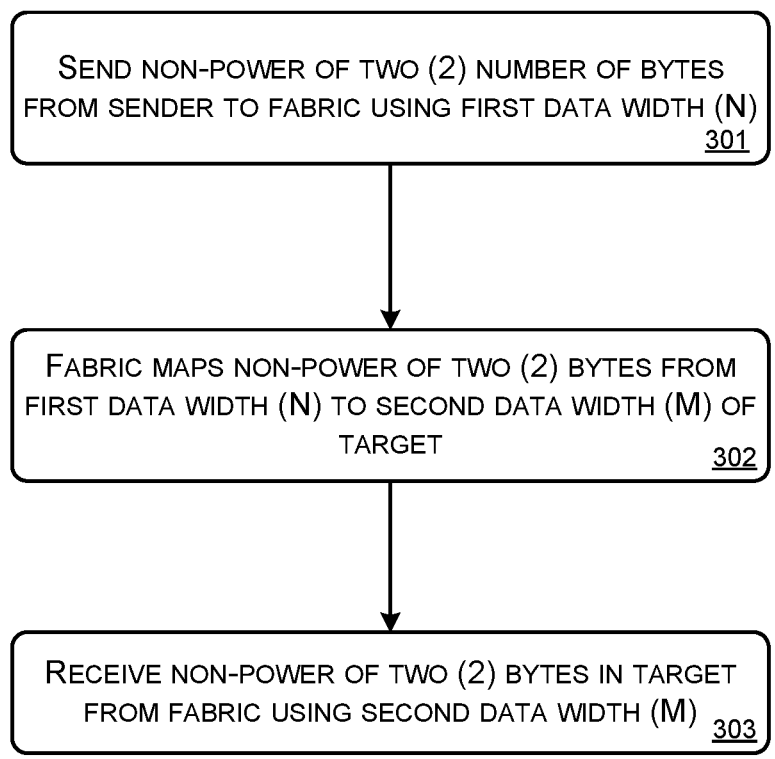
FIG. 3 illustrates a method of communicating non-power of two (2) bytes of data according to an embodiment.

FIG. 3 illustrates a method of communicating non-power of two (2) bytes of data according to an embodiment. At 301, a non-power of two (2) number of bytes of data is sent from a sender module to an on-chip communication fabric over an interface having a first data width. The on-chip communication fabric may comprise an on-chip bus connecting a plurality of on-chip modules including the sender module, for example. At 302, the fabric maps the non-power of two (2) bytes of data from the first data width (N) of the sender module to a second data width (M) of a target module. The second data width may be less than the first data width (M<N). At 303, the non-power of two (2) bytes of data is received from the fabric in the target module.

Figure 4:
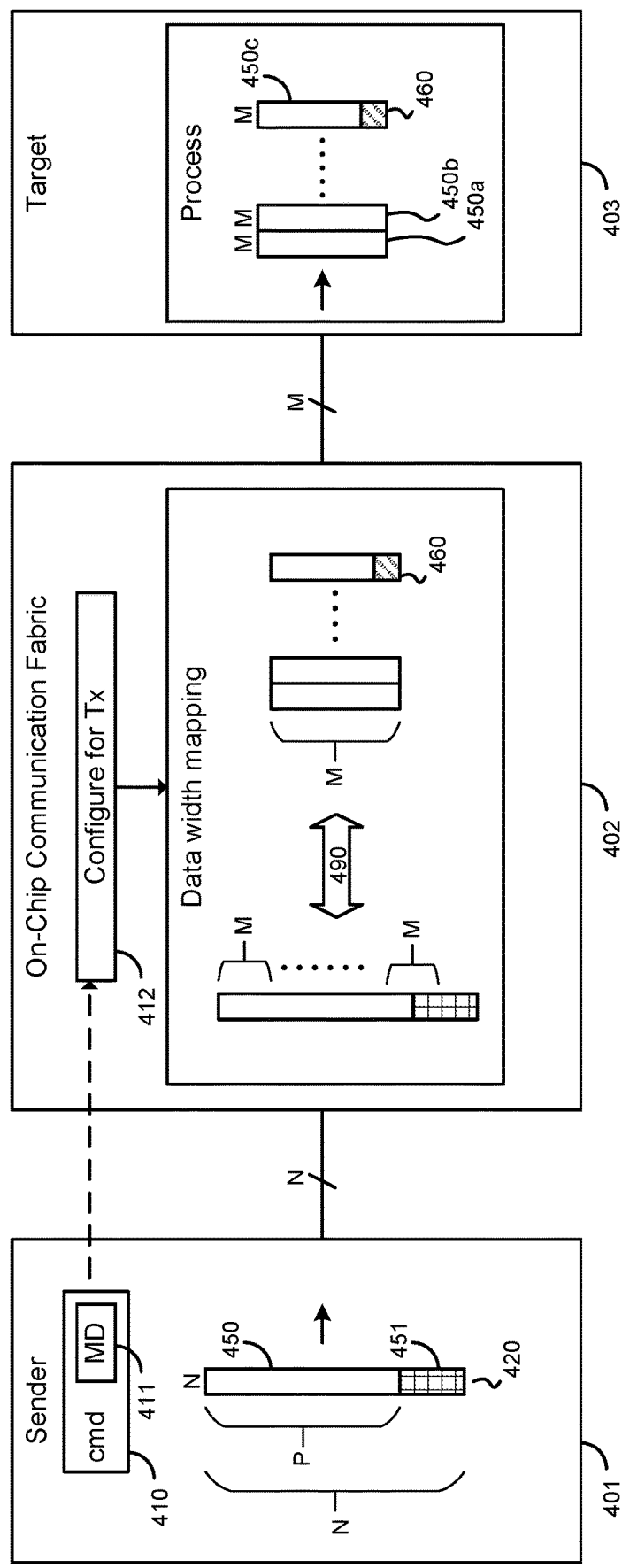
FIG. 4 illustrates an on-chip communication fabric for transferring non-power of two (2) bytes of data according to another embodiment.

FIG. 4 illustrates an on-chip communication fabric for transferring non-power of two (2) bytes of data according to another embodiment. This example illustrates a data transfer from a sender module 401 to a target module 403 over on-chip communication fabric 402. Initially, sender 401 generates a command to be sent across the fabric to initiate the transaction. A command (cmd) 410 may include metadata (MD) 411 describing the non-power of two (2) number of bytes in the transaction (e.g., the transaction data width). The metadata describing the transaction may be implemented in a variety of ways. In one embodiment, the metadata comprises a start byte and a total number of bytes for the non-power of two (2) bytes of data being transferred. In another embodiment, the metadata comprises a start byte and an end byte for the non-power of two (2) bytes of data. Sender module 401 may determine the transaction data width and store it in the metadata fields. As described in more detail below, fabric 402 may arrange the data passed between the modules such that the module with the larger interface receives data offset relative to the full data width of the interface. For example, the sender module and/or fabric may use the metadata to read particular portions (e.g., particular byte segments) of the offset data being transferred. Because the transactions may be non-power of two (2), this feature allows the modules to determine the alignment of the data in the interface, so the module knows where the non-power of two (2) data is located in a power of two (2) based interface (e.g., the lower byte and upper byte). A more detailed example of such an offset is provided below.

Sender module 401 initiates the transaction by generating command 410 comprising the metadata 411 and sending the command to the fabric 402. Fabric 402 receives command 410 and uses metadata 411 to configure the transaction as illustrated at 412. For example, fabric 402 may configure the mapping based on the metadata in the command. The fabric may receive information about the sender and target interface data widths either as part of the transaction or prior to the transaction (e.g., as part of a startup process where data widths of all the modules coupled to the fabric are determined). Fabric 402 may convert a non-power of two (2) data transaction to one or multiple data transactions that match the target data width and send the data transactions to target module 403.

The data for the transaction is then sent from the sender interface to the fabric. In this example, sender 401 comprises an interface capable of sending N bytes per cycle to fabric 402. An example transaction 420 includes P (a non-power of two (2) integer less than N, where N may be a power of two (2)) bytes of data 450, which leaves N-P bytes of unused/ "don't care" bytes 451, for example. While the data shown here fits into one cycle, it is to be understood that larger data transfers may fill one or more cycles and may leave other cycles partially filled, for example. If sender 401 is sending a payload size less than the full data width of the sender interface, these unused bytes may still be conveyed to the fabric 402. In this example, data 450 and unused bytes 451 are received in fabric 402 and mapped to a data width M of target 403. In some cases, if the entire payload size is an integer multiple of the target interface data width (e.g., N=X*M; X is an integer), then all unused payload is eliminated, and the data may fill a number of data transfers from fabric 402 to the target 403. In this example, the payload size is not an integer multiple of the target interface data width. Accordingly, the unused payload is reduced. The remaining unused data is the modulo of the target interface data width (e.g., P mod M).

Figure 5:
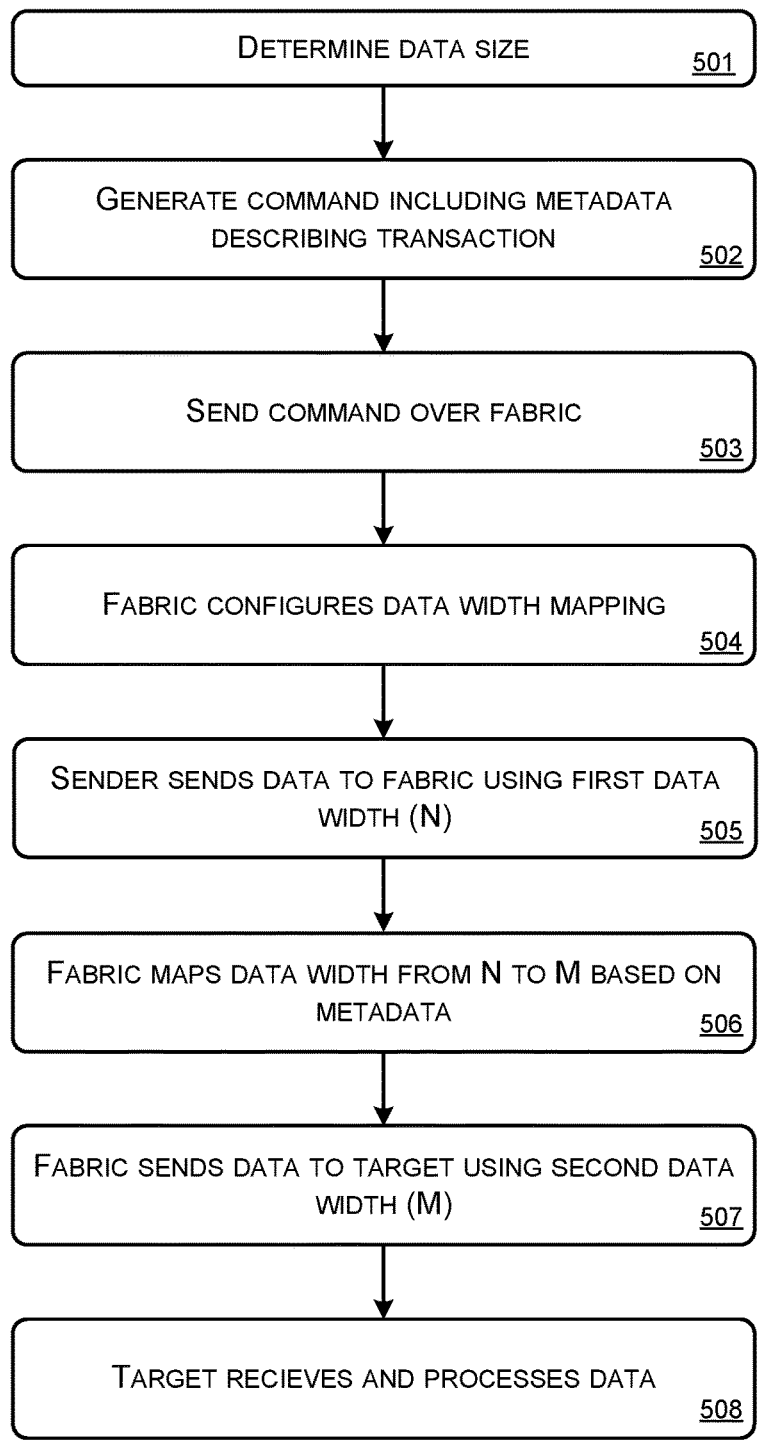
FIG. 5 illustrates transferring non-power of two (2) bytes of data according to another embodiment.

FIG. 5 illustrates transferring non-power of two (2) bytes of data according to another embodiment. At 501, the data size of a data payload to be transmitted across an on-chip communication fabric is determined. The data may include a start address for the lowest byte of the transfer (e.g., the lowest starting byte, LSB). At 502, a command is generated in the sending module. The command includes metadata describing the transaction. The metadata may describe a non-power of two (2) bytes of data being transferred so that the fabric can process the transaction using the techniques described herein, for example. At 503, the command is sent over the fabric from the sending module. At 504, the fabric configures a data width mapping using the metadata. The data width mapping may convert non-power of two (2) data payloads from the sender interface data width to the target interface data width. At 505, the sender sends the data to the fabric using a first data width (N). At 506, the fabric maps the data width from N to a second data width of the target, M, based on the metadata. As mentioned above, the fabric may determine N and M before or during the transaction, for example. At 507, the fabric sends the data to the target using the second data width (M, M<N). At 508, the target receives and processes the data, for example, over one or more cycles where M bytes are received on each cycle.

Figure 6:
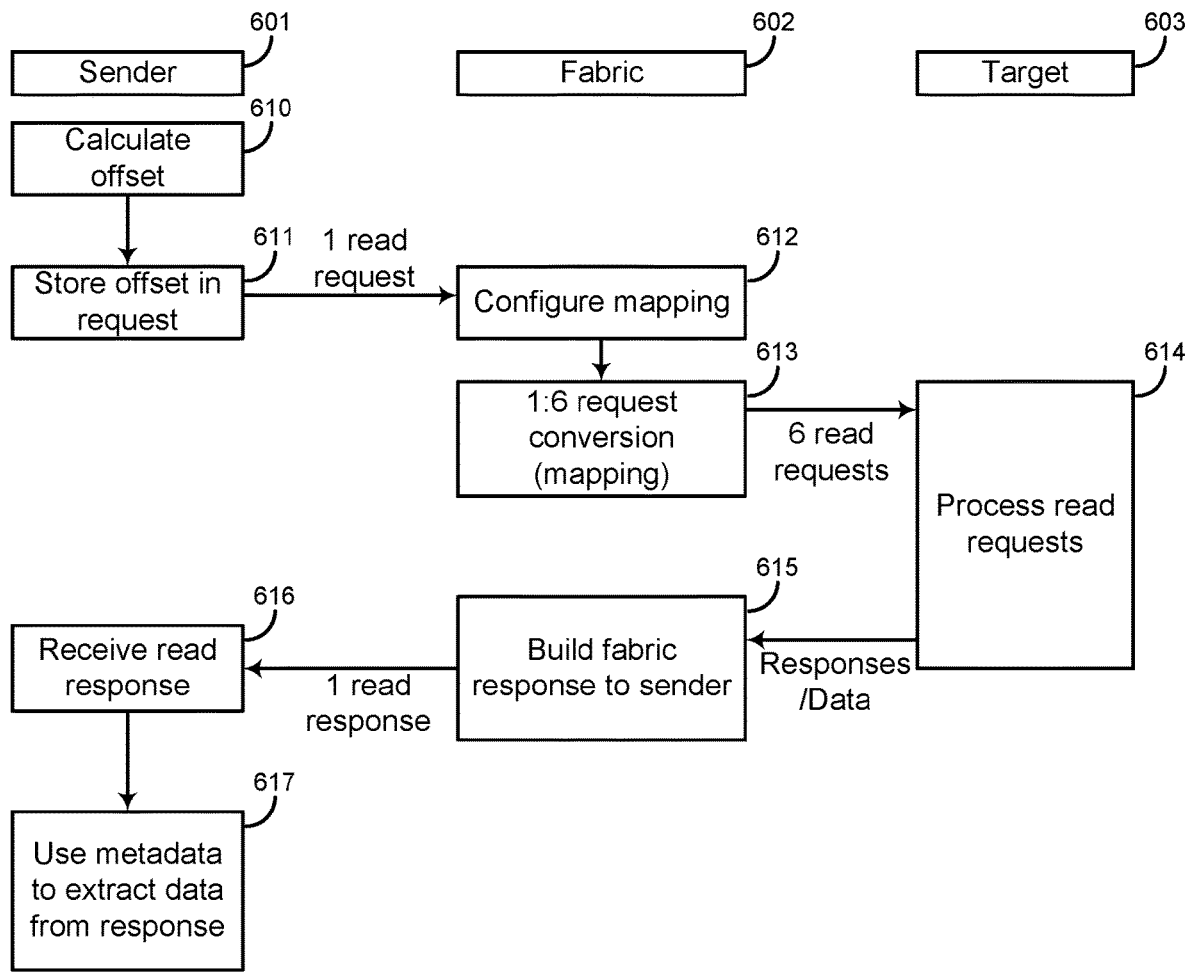
FIG. 6 illustrates a sender module performing a read transaction with a target module over a fabric according to an embodiment.

FIG. 6 illustrates a sender module 601 performing a read transaction with target module 603 over fabric 602 according to an embodiment. First, sender 601 calculates an offset at 610. The offset may comprise a start byte and the total number of bytes or end byte. At 611, sender 601 stores the results in a metadata field of a read request (or command). The request is then sent to fabric 602. Fabric 602 receives the request and configures the mapping at 612 using the metadata in the request. In this example, fabric 602 may convert the non-power of two (2) read request to multiple requests (e.g., multiple transfer cycles or beats) that match the target data width and send them to target 603. While the following examples illustrate generating multiple requests, it is to be understood that the initial request may result in multiple transfer cycles or multiple beats. In this example, the sender module to fabric interface is 256 B wide, and the target module to fabric interface is 32 B wide. If the sender attempts to read 192 B of data (non-power of 2) from address <A>+0x20, it sends a read request as: address=<A>, start_byte=0x20, and total_byte=0xC0 (192 B), where "address=<A>" is 256 B aligned memory address used to select the data location in the target memory space, "start_byte" and "total_byte" are an offset on the bus between the sender and fabric, and 0x00 is hexadecimal notation. Fabric 602 receives the request from sender 601 and converts the request (at 613) into 6 read requests from fabric 602 to target 603. In this example, the 6 requests are as follows:

1st: {addr, size}={<A>+0x20, 0x20}
2nd: {addr, size}={<A>+0x40, 0x20}
3rd: {addr, size}={<A>+0x60, 0x20}
4th: {addr, size}={<A>+0x80, 0x20}
5th: {addr, size}={<A>+0xA0, 0x20}
6th: {addr, size}={<A>+0xC0, 0x20}

In various embodiments, fabric 602 may either send the above requests one at a time and receive responses before sending the next request, or fabric 602 may send all the above requests and only receive the responses after the last request has been sent, which may be the case, for example, where target 603 takes time to process the requests before responding with the data. In either case, target 603 processes the requests at 614 and fabric 602 receives 6 responses of data from target 603 (e.g., over 6 cycles) that are each 32 B. Fabric 602 may also arrange the read response data based on the offset so that the data is in the right place on the wider 256 B interface with sender 601. For example, the first 32 B may be designated as "don't care" and the last 32 B may be designated "don't care." Fabric 602 receives data responses from target 603 and builds a "fabric response" to the sender at 615 as follows:

1st: target responds with 1st 32 B data, and fabric puts the data response in fabric response data bit[511:256] (2nd 32 B location)
2nd: target responds with 2nd 32 B data, and fabric puts the data response in fabric response data bit[767:512] (3rd 32 B location)
3rd: target response 3rd 32 B data, and fabric puts the data response in fabric response data bit[1023:768] (4th 32 B location)
4th: target response 4th 32 B data, and fabric puts the data response in fabric response data bit[1279:1024] (5th 32 B location)
5th: target response 5th 32 B data, and fabric puts the data response in fabric response data bit[1535:1280] (6th 32 B location)
6th: target response 6th 32 B data, and fabric puts the data response in fabric response data bit[1792:1536] (7th 32 B location)

Note that the fabric has offset the non-power of two (2) data in the interface based on the metadata (here, based on start_byte=0x20 and total_byte=0xC0). After fabric 602 receives all 6 responses from target 603, it then sends data[2047:0] (256 B) as a read response transaction to sender 601. After sender 601 receives the read response transaction at 616, it uses the offset metadata (e.g., start_byte, total_byte/end_byte) to select data bit[1792:256] (2nd to 7th 32 B) as the 192 B read response data at 617.

Compared to existing protocols, it can be seen that the above example of the presently disclosed technique saves 2 read requests to the target as follows (e.g., the following read requests would normally be sent from the fabric to the target, but are not needed in this example):

0th: {addr, size}={<A>+0x0, 0x20}
7th: {addr, size}={<A>+0xE0, 0x20}

Figure 7:
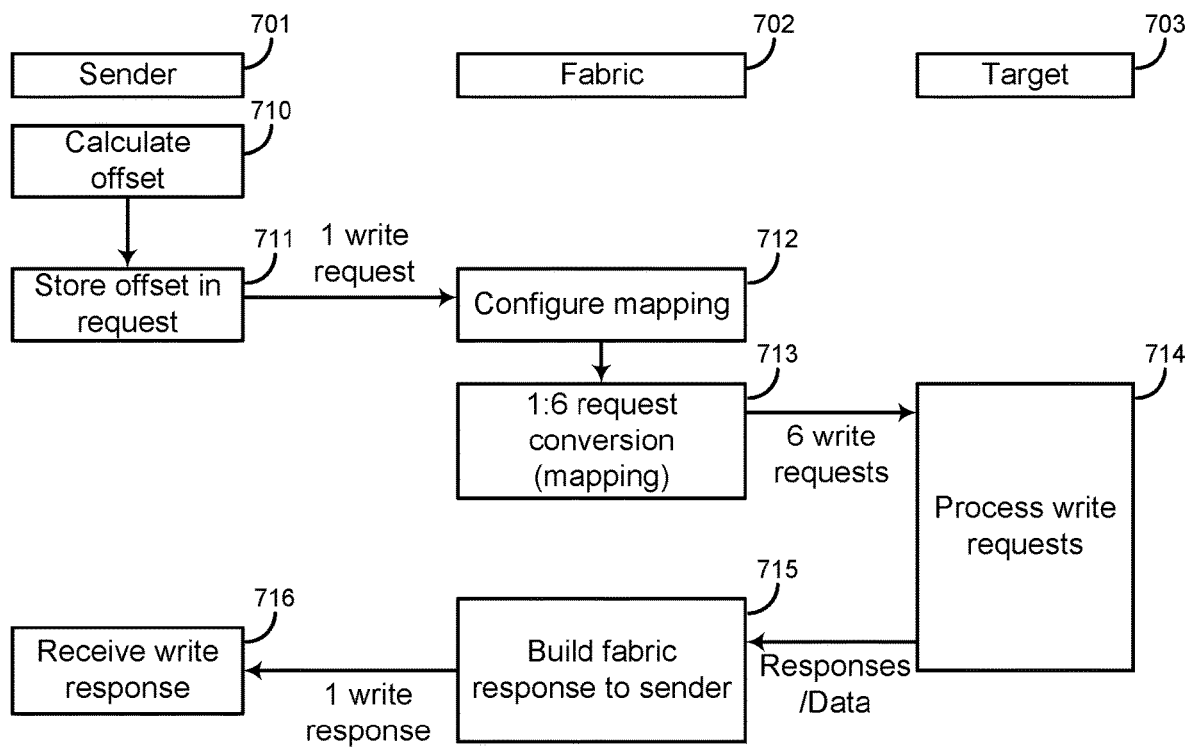
FIG. 7 illustrates a sender module performing a write transaction with a target module over a fabric according to an embodiment.

FIG. 7 illustrates a sender module 701 performing a write transaction with target module 703 over fabric 702 according to an embodiment. First, sender 701 calculates an offset at 710. The offset may comprise a start byte and the total number of bytes or end byte. At 711, sender 701 stores the results in a metadata field of a write request (or command). The request is then sent to fabric 702. Fabric 702 receives the request and configures the mapping at 712. In this example, fabric 702 may convert the non-power of two (2) write request to multiple write requests that match the target data width and send them to target 703. In this example, the sender module to fabric interface is 256 B wide, and the target module to fabric interface is 32 B wide. If the sender attempts to write 192 B of data (non-power of 2) to address <A>+0x20, it sends a write request as: address=<A>, start_byte=0x20, and total_byte=0xC0 (192 B), where "address=<A>" is 256 B aligned memory address used to select the data location in the target memory space, "start_byte" and "total_byte" are an offset on the bus, and 0x00 is hexadecimal notation. Fabric 702 receives the request from sender 701 and converts the request (at 713) into 6 write requests from fabric 702 to target 703. In this example, the requests are as follows:

1st: {addr, size}={<A>+0x20, 0x20} with 32 B write data from data bit[511:256] (2nd 32 B location)
2nd: {addr, size}={<A>+0x40, 0x20} with 32 B write data from data bit[767:512] (3rd 32 B location)
3rd: {addr, size}={<A>+0x60, 0x20} with 32 B write data from data bit[1023:768] (4th 32 B location)
4th: {addr, size}={<A>+0x80, 0x20} with 32 B write data from data bit[1279:1024] (5th 32 B location)
5th: {addr, size}={<A>+0xA0, 0x20} with 32 B write data from data bit[1535:1280] (6th 32 B location)

6th: {addr, size}={<A>+0xC0₃ 0x20} with 32 B write data from data bit[1792:1536] (7th 32 B location)

In various embodiments of a write request, the write command and data may be sent from the fabric to the target simultaneously (e.g., in parallel) over separate command and data buses for execution, for example, or one or more commands may be sent before the data. In either case, fabric 702 sends 6 write requests to target module 703 (e.g., over 6 cycles) that each include 32 B of data. Target 703 processes the write requests at 714 and provides 6 write responses. Fabric 702 receives the 6 write responses from target module 703. After fabric 702 receives all 6 write responses from target 703, it builds a single write response at 715 and sends the write response to sender 701. Sender receives the write response at 716.

Compared to existing protocols, it can be seen that the above example of the presently disclosed technique saves 2 write requests to the target as follows (e.g., the following write requests would normally be sent from the fabric to the target, but are not needed in this example):

0th: {addr, size}={<A>+0x0, 0x20}+"don't care" data
7th: {addr, size}={<A>+0xE0, 0x20}+"don't care" data In other cases the present techniques can reduce even more transaction cycles for read and write transaction, thus saving power and increasing the speed of the system, for example.

Further Examples

Each of the following non-limiting examples may stand on its own or may be combined in various permutations or combinations with one or more of the other examples.

In one embodiment, the present disclosure includes an integrated circuit comprising: an on-chip communication fabric; a first module comprising an interface coupled to the on-chip communication fabric having a first data width; and a second module comprising an interface coupled to the on-chip communication fabric having a second data width smaller than the first data width, wherein a non-power of two (2) bytes of data are sent between the first module and the second module through the on-chip communication fabric, and wherein the on-chip communication fabric maps the non-power of two (2) bytes of data between the first data width and the second data width.

In another embodiment, the present disclosure includes a method of transferring data comprising: sending a non-power of two (2) number of bytes of data between a first module and a second module over an on-chip communication fabric, the first module having a first data width and the second module having a second data width less than the first data width, the on-chip communication fabric comprising an on-chip bus connecting a plurality of on-chip modules including the first module and the second module; and mapping the non-power of two (2) bytes of data between the first data width of the first module and the second data width of the second module as the data passes through the on-chip communication fabric.

In another embodiment, the present disclosure includes a non-transitory computer readable storage medium having stored thereon program code executable by one or more control processors, the program code causing the one or more control processors to: send a non-power of two (2) number of bytes of data between a first module and a second module over an on-chip communication fabric, the first module having a first data width and the second module having a second data width less than the first data width, the on-chip communication fabric comprising an on-chip bus connecting a plurality of on-chip modules including the first module and the second module; and map the non-power of two (2) bytes of data between the first data width of the first module and the second data width of the second module as the data passes through the on-chip communication fabric.

In one embodiment, the on-chip communication fabric comprises an on-chip synchronous bus connecting a plurality of on-chip modules, the on-chip synchronous bus comprising separate wires for commands and data.

In one embodiment, the first module initiates a transaction by generating a command, the command comprising metadata describing the non-power of two (2) number of bytes in the transaction.

In one embodiment, the metadata comprises a start byte and one of a total number of bytes or an end byte for the non-power of two (2) bytes of data.

In one embodiment, the metadata specifies an offset in the first module interface or the second module interface of the non-power of two (2) bytes of data.

In one embodiment, the on-chip communication fabric configures the mapping based on the metadata in the command.

In one embodiment, the non-power of two (2) bytes of data are sent from the second module to the first module through the on-chip communication fabric during a read command, wherein the on-chip communication fabric receives the read command from the first module and generates a plurality of read commands to the second module, and wherein the on-chip communication fabric generates a response to the first module comprising the non-power of two (2) bytes of data received from the second module in response to the plurality of read commands.

In one embodiment, the non-power of two (2) bytes of data are sent from the first module to the second module through the on-chip communication fabric during a write command, wherein the on-chip communication fabric receives the write command and the non-power of two (2) bytes of data from the first module and generates a plurality of write commands to the second module, the plurality of write commands each having corresponding amounts of data that are less than or equal to the second data width.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. An integrated circuit comprising:
an on-chip communication fabric;
a first module comprising an interface coupled to the on-chip communication fabric having a first data width;
a second module comprising an interface coupled to the on-chip communication fabric having a second data width smaller than the first data width; and
a third module comprising an interface coupled to the on-chip communication fabric having a third data width less than the first data width and different from the second data width,
wherein the first module initiates a first transaction by generating a first command, the first command comprising first metadata describing a first non-power of two (2) number of bytes in the first transaction, and wherein the first module initiates a second transaction by generating a second command, the second command comprising second metadata describing a non-power of two (2) number of bytes in the second transaction, wherein the non-power of two (2) bytes of data in the first transaction are sent between the first module and the second module during the first transaction through the on-chip communication fabric, and wherein the on-chip communication fabric maps the non-power of two (2) bytes of data in the first transaction between the first data width and the second data width based on the first metadata, and wherein the non-power of two (2) bytes of data in the second transaction are sent between the first module and the third module during the second transaction through the on-chip communication fabric, and wherein the on-chip communication fabric maps the non-power of two (2) bytes of data in the second transaction between the first data width and the third data width based on the second metadata.

2. The integrated circuit of claim 1, wherein the on-chip communication fabric comprises an on-chip synchronous bus connecting a plurality of on-chip modules, the on-chip synchronous bus comprising separate wires for commands and data.

3. The integrated circuit of claim 1, wherein the metadata comprises a start byte and one of a total number of bytes or an end byte for the non-power of two (2) bytes of data.

4. The integrated circuit of claim 1, wherein the metadata specifies an offset in the first module interface or the second module interface of the non-power of two (2) bytes of data.

5. The integrated circuit of claim 1, wherein the on-chip communication fabric configures the mapping based on the metadata in the command.

6. The integrated circuit of claim 1, wherein the non-power of two (2) bytes of data are sent from the second module to the first module through the on-chip communication fabric during a read command, wherein the on-chip communication fabric receives the read command from the first module and generates a plurality of read commands to the second module, and wherein the on-chip communication fabric generates a response to the first module comprising the non-power of two (2) bytes of data received from the second module in response to the plurality of read commands.

7. The integrated circuit of claim 1, wherein the non-power of two (2) bytes of data are sent from the first module to the second module through the on-chip communication fabric during a write command, wherein the on-chip communication fabric receives the write command and the non-power of two (2) bytes of data from the first module and generates a plurality of write commands to the second module, the plurality of write commands each having corresponding amounts of data that are less than or equal to the second data width.

8. A method of transferring data comprising:
sending a first non-power of two (2) number of bytes of data in a first transaction between a first module and a second module over an on-chip communication fabric, the first module having a first data width and the second module having a second data width less than the first data width, the on-chip communication fabric comprising an on-chip bus connecting a plurality of on-chip modules including the first module, the second module, and a third module; and
mapping the first non-power of two (2) bytes of data in a first transaction between the first data width of the first module and the second data width of the second module as the data passes through the on-chip communication fabric based on first metadata describing the first non-power of two (2) number of bytes in the first transaction;

sending a second non-power of two (2) number of bytes of data in a second transaction between the first module and a third module over the on-chip communication fabric, the third module having a third data width less than the first data width and different than the second data width; and mapping the second non-power of two (2) bytes of data in a second transaction between the first data width of the first module and the third data width of the third module as the data passes through the on-chip communication fabric based on second metadata describing the second non-power of two (2) number of bytes in the second transaction.

9. The method of claim 8, wherein the metadata comprises a start byte and one of a total number of bytes or an end byte for the non-power of two (2) bytes of data.

10. The method of claim 8, wherein the on-chip communication fabric configures the mapping based on the metadata in the command.

11. The method of claim 8, wherein the non-power of two (2) bytes of data are sent from the second module to the first module through the on-chip communication fabric during a read command, wherein the on-chip communication fabric receives the read command from the first module and generates a plurality of read commands to the second module, and wherein the on-chip communication fabric generates a response to the first module comprising the non-power of two (2) bytes of data received from the second module in response to the plurality of read commands.

12. The method of claim 8, wherein the non-power of two (2) bytes of data are sent from the first module to the second module through the on-chip communication fabric during a write command, wherein the on-chip communication fabric receives the write command and the non-power of two (2) bytes of data from the first module and generates a plurality of write commands to the second module, the plurality of write commands each having corresponding amounts of data that are less than or equal to the second data width.

13. A non-transitory computer readable storage medium having stored thereon program code executable by one or more control processors, the program code causing the one or more control processors to:
send a first non-power of two (2) number of bytes of data in a first transaction between a first module and a second module over an on-chip communication fabric, the first module having a first data width and the second module having a second data width less than the first data width, the on-chip communication fabric comprising an on-chip bus connecting a plurality of on-chip modules including the first module, the second module, and a third module;
map the first non-power of two (2) bytes of data in a first transaction between the first data width of the first module and the second data width of the second module as the data passes through the on-chip communication fabric based on first metadata describing the first non-power of two (2) number of bytes in the first transaction;
send a second non-power of two (2) number of bytes of data in a second transaction between the first module and a third module over the on-chip communication fabric, the third module having a third data width less than the first data width and different than the second data width; and map the second non-power of two (2) bytes of data in a second transaction between the first data width of the first module and the third data width of the third module as the data passes through the on-chip communication fabric based on second metadata describing the second non-power of two (2) number of bytes in the second transaction.

14. The non-transitory computer readable storage medium of claim 13, wherein the metadata comprises a start byte and one of a total number of bytes or an end byte for the non-power of two (2) bytes of data.

15. The non-transitory computer readable storage medium of claim 13, wherein the on-chip communication fabric configures the mapping based on the metadata in the command.

16. The non-transitory computer readable storage medium of claim 13, wherein the non-power of two (2) bytes of data are sent from the second module to the first module through the on-chip communication fabric during a read command, wherein the on-chip communication fabric receives the read command from the first module and generates a plurality of read commands to the second module, and wherein the on-chip communication fabric generates a response to the first module comprising the non-power of two (2) bytes of data received from the second module in response to the plurality of read commands.

17. The non-transitory computer readable storage medium of claim 13, wherein the non-power of two (2) bytes of data are sent from the first module to the second module through the on-chip communication fabric during a write command, wherein the on-chip communication fabric receives the write command and the non-power of two (2) bytes of data from the first module and generates a plurality of write commands to the second module, the plurality of write commands each having corresponding amounts of data that are less than or equal to the second data width.

* * * * *